(12) United States Patent
Hineno et al.

(10) Patent No.: US 8,105,061 B2
(45) Date of Patent: Jan. 31, 2012

(54) CONTAINER MOLD EXCHANGING APPARATUS

(75) Inventors: Yoshikatsu Hineno, Hiroshima (JP); Toshifumi Murakami, Hiroshima (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 277 days.

(21) Appl. No.: 12/611,618

(22) Filed: Nov. 3, 2009

(65) Prior Publication Data

US 2010/0112109 A1 May 6, 2010

(30) Foreign Application Priority Data

Nov. 5, 2008 (JP) ................................. 2008-284127

(51) Int. Cl.
*B29C 33/30* (2006.01)
(52) U.S. Cl. .......... 425/28.1; 425/46; 425/186; 425/195
(58) Field of Classification Search ................. 425/28.1, 425/34.1, 46, 186, 195
See application file for complete search history.

(56) References Cited

U.S. PATENT DOCUMENTS

| | | | | |
|---|---|---|---|---|
| 4,883,415 | A * | 11/1989 | Salvadori | 425/47 |
| 6,292,993 | B1 * | 9/2001 | Ito et al. | 425/195 |
| 6,461,134 | B1 * | 10/2002 | Ito et al. | 425/195 |
| 7,354,261 | B1 * | 4/2008 | Hineno et al. | 425/46 |

FOREIGN PATENT DOCUMENTS

| | | |
|---|---|---|
| DE | 3637098 A1 | 5/1988 |
| DE | 3723830 A1 | 1/1989 |
| JP | 10-156833 A | 6/1998 |
| JP | 11333845 A | 12/1999 |
| JP | 2000280253 A | 10/2000 |
| JP | 2001-001345 A | 1/2001 |
| JP | 3814163 B2 | 8/2006 |
| JP | 4038301 B2 | 1/2008 |

OTHER PUBLICATIONS

Korean Office Action for Korean Application No. 2009-0105280 issued Jun. 8, 2011.
EP Seach Report for EP09174777.4 mailed Mar. 5, 2010.

* cited by examiner

*Primary Examiner* — James Mackey
(74) *Attorney, Agent, or Firm* — Kanesaka Berner & Partners (57) ABSTRACT

A container mold exchanging apparatus includes: a container support body which supports the jacket of the container from which the lower sidewall mold is separated; a gripping mechanism which includes upper and lower gripping members and grips each tread mold so as to be interposed between the upper and lower gripping members in the vertical direction; first and second driving mechanisms which respectively elevate the upper and lower gripping members; a third driving mechanism which expands or contracts the upper and lower gripping members in the radial direction of the container; and a fourth driving mechanism which moves the gripping mechanism along the axis of the container relative to the container support body.

5 Claims, 6 Drawing Sheets

CONTAINER MOLD EXCHANGING APPARATUS

Priority is claimed on Japanese Patent Application No. 2008-284127, filed on Nov. 5, 2008, the contents of which are incorporated herein by reference.

BACKGROUND OF THE INVENTION

1. Field of the Invention

The present invention relates to a container mold exchanging apparatus for exchanging a tread mold which is used to mold a tire and is mounted on a container.

2. Description of the Related Art

For some time, as molds used in a tire vulcanizing device for molding a tire by vulcanizing, various structures of molds have been known. As an example, there is known a structure in which a container of a vulcanizing device is provided with a mold including upper and lower sidewall molds used for molding both sidewalls of a tire with the tire interposed therebetween in the vertical direction and a plurality of tread molds arranged on the outer periphery of the tire so as to mold a tread of the tire. The container of the vulcanizing device is substantially formed in a cylindrical shape and includes a top plate which is formed in a disk shape so as to form the upper surface of the cylindrical container and to which an upper sidewall mold is fixed, a lower plate which is formed in a disk shape so as to form the lower surface of the cylindrical container and to which a lower sidewall mold is fixed, a jacket which is substantially formed in a cylindrical shape so as to form the side surface of the cylindrical container, and a plurality of segments which are arranged in the inside of the jacket so as to respectively correspond to the plurality of tread molds. In addition, the plural segments are arranged in the inside of the jacket and are substantially formed in a cylindrical shape. The outer diameter of the cylindrical shape formed by the plurality of segments gradually increases downward along the axis of the container. In addition, the inner diameter of the jacket gradually increases downward along the axis of the container.

When molding the tire, first, a green tire is disposed between the upper and lower sidewall molds. Then, when the jacket disposed on the outside of the segments moves down along the axis of the container, the segments and the tread molds move inward in the radial direction. Accordingly, the upper and lower sidewall molds and the tread molds are integrated with each other. In this state, the inside of the tire is pressurized and heated at a vulcanizing temperature, thereby molding the tire.

In this kind of mold, for example, a technology has been disclosed in which a mold of a container of a vulcanizing device is efficiently and reliably exchanged when the mold is required to be exchanged in accordance with the type of the tire (for example, see Japanese Patent No. 3814163).

In many cases, in the container separated from the vulcanizing device, the tread mold exchanging operation is manually performed.

Figure 6:
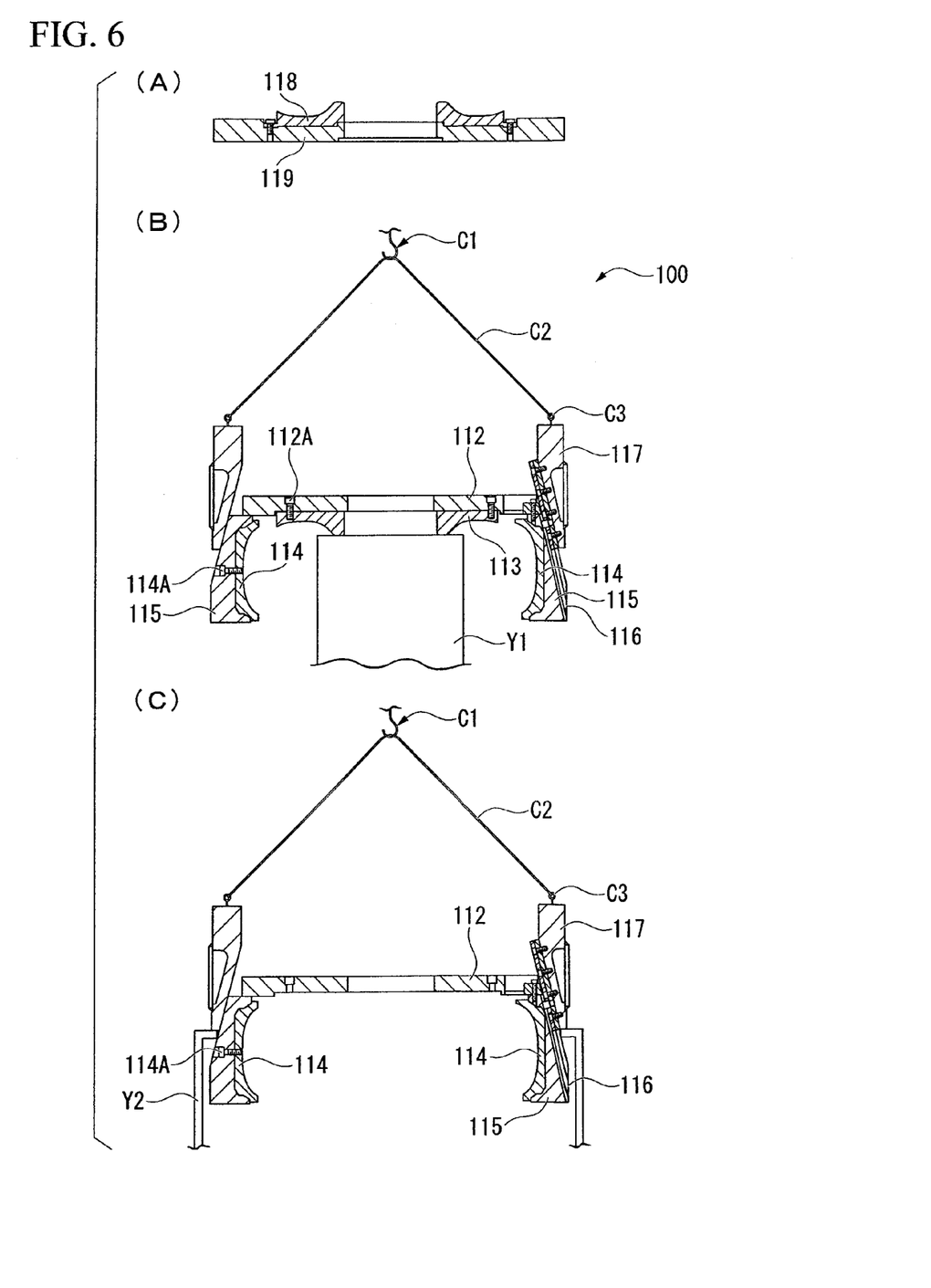
FIG. 6 is a diagram illustrating a sequence of separating the tread mold from the container in the known method.

FIG. 6 is diagrams illustrating a known sequence of separating the tread molds from the container.

First, when a wire C2 suspended on a lifting bolt C3 mounted on a jacket 117 of a container 100 separated from the vulcanizing device is lifted up by a hoist C1, a lower sidewall mold 118 and a lower plate 119 are separated from the container 100. (A) of FIG. 6 shows the lower sidewall mold 118 and the lower plate 119 which are separated from the container 100.

Next, as shown in (B) of FIG. 6, the container 100, which is suspended on the hoist C1 and from which the lower sidewall mold 118 and the lower plate 119 are separated, is placed on a base Y1. Then, an attachment bolt 112A used for attaching a sidewall mold 113 to a top plate 112 is loosened so as to separate the upper sidewall mold 113 from the top plate 112.

In addition, as shown in (B) of FIG. 6, the outer diameter of the cylindrical shape formed by a plurality of segments 115 gradually increases downward along the axis of the container 100, and the inner diameter of the jacket 117 gradually increases downward along the axis thereof. In this way, the outer diameter formed by the segments 115 and the inner diameter of the jacket 117 are formed to conform each other, and a guide 116 is disposed therebetween.

Subsequently, as shown in (C) of FIG. 6, the container 100 from which the upper sidewall mold 113 is separated is placed on another base Y2. In addition, an operator directly enters the inside of a tread mold 114 and loosens an attachment bolt 114A while supporting the tread mold 114 so as to separate the tread mold 114 from the segments 115.

As described above, in the tread mold exchanging operation in the container separated from the vulcanizing device, several operators are required for the operation, and it is difficult for the operators to support the heavy tread molds in a hot environment.

In order to solve such a difficulty in a hot environment, the tread mold exchanging operation may be performed after the tread molds are cooled to a normal temperature. However, in order to efficiently perform the tread mold exchanging operation in consideration of the cooling time, many containers have to be prepared, which causes problems such as the cost for the investment in the facility increases, a large amount of space is required for disposing the container to be cooled, and the working efficiency deteriorates. In addition, in the case of mounting the container to the vulcanizing device, it is necessary to increase the temperature of the cooled container again.

For this reason, there has been a demand for a technology for easily and efficiently performing the tread mold exchanging operation in the container.

The present invention is contrived in consideration of the above-described problems, and an object of the present invention is to provide a container mold exchanging apparatus capable of easily and efficiently performing an exchange operation (a mounting operation and a separating operation) of a tread mold of a container separated from a vulcanizing device, reducing a load in the exchange operation, and improving safety in the exchange operation.

SUMMARY OF THE INVENTION

In order to solve the above-described problems, according to an aspect of the present invention, there is provided a container mold exchanging apparatus for exchanging tread molds of a substantially cylindrical container including an upper sidewall mold which molds a sidewall as one side of a tire, a lower sidewall mold which molds a sidewall as the other side of the tire, a plurality of tread molds which mold a tread of the tire, a top plate which is formed in a disk shape and to which the upper sidewall mold is fixed, a lower plate which is formed in a disk shape and to which the lower sidewall mold is fixed, a jacket which is substantially formed in a cylindrical shape, and a plurality of segments which are arranged in the inside of the jacket and to which the plurality of tread molds are respectively fixed. The container mold exchanging apparatus includes: a container support body which supports the jacket of the container from which the lower sidewall mold is separated; a gripping mechanism which includes upper and lower gripping members and grips each tread mold so as to be interposed between the upper and lower gripping members in the vertical direction; first and second driving mechanisms which respectively elevate the upper and lower gripping members; a third driving mechanism which expands or contracts the upper and lower gripping members in the radial direction of the container; and a fourth driving mechanism which moves the gripping mechanism along the axis of the container relative to the container support body.

In the container mold exchanging apparatus according to this aspect of the present invention, in the state where the lower sidewall mold is separated from the container, the container is supported on the container support body, and the gripping mechanism is moved up by the fourth driving mechanism so that the upper gripping member is located at a position higher than the upper surface of the tread mold and the lower gripping member is located at a position lower than the lower surface of the tread mold.

Then, the gripping mechanism is expanded by the third driving mechanism, and the first and second driving mechanisms are operated so as to grip the upper and lower portions of the tread mold by using the gripping mechanism.

The tread mold is gripped by the gripping mechanism, and the tread mold is separated from the segment (for example, by loosening the attachment bolt) in a state in which the tread mold is not dropped or collapsed.

Subsequently, in the state where the tread mold is gripped, the gripping mechanism is contracted by operating the third driving mechanism and the tread mold is separated from the segment toward the inside in the radial direction. Next, the fourth driving mechanism is operated so as to move down the tread mold.

In addition, the sequence of the tread mold mounting operation to the segment of the container can be performed in reverse to the above sequence.

As a result, it is possible to easily and efficiently separate or mount the tread mold from or to the container without supporting the tread mold by hand.

The container mold exchanging apparatus may further include a mold support body which supports the plurality of tread molds separated from the plurality of segments.

In this case, since the mold support body for supporting the tread mold is provided, it is possible to easily support the tread mold separated from the segment. As a result, it is possible to easily and efficiently separate or mount the tread mold.

The container mold exchanging apparatus may further include an upper sidewall mold exchanging mechanism which separates the upper sidewall mold from the container from which the lower sidewall mold is separated.

In this case, since the upper sidewall mold exchanging mechanism is provided, it is possible to easily and efficiently separate the upper side wall mold. As a result, it is possible to easily and efficiently separate or mount the tread mold.

The container mold exchanging apparatus may further include a first moving mechanism which moves the separated tread mold to the mold support body.

In this case, since the first moving mechanism, which moves the separated tread mold or the tread mold to be mounted between the container support body and the mold support body, is provided, it is possible to efficiently move the tread mold between the container support body and the mold support body.

The mold support body may include a first placement portion which is placed the separated tread mold thereon; a second placement portion which is placed the tread mold to be mounted thereon; and a second moving mechanism which moves one of the first and second placement portions to a delivery position where the tread mold is transferred.

In this case, since the mold support body includes the first placement portion and the second placement portion, the first placement portion and the second placement portion are moved to the delivery position by the second moving mechanism. Accordingly, it is possible to easily and efficiently exchange the separated tread mold with the tread mold to be mounted.

In the container mold exchanging apparatus according to this aspect of the present invention, it is possible to easily and efficiently perform the tread mold exchanging operation (the mounting operation and the separating operation) of the container separated from the vulcanizing device. As a result, it is possible to reduce a load in the exchange operation and to improve safety in the exchange operation.

In addition, since the tread mold of the container is efficiently exchanged, it is possible to reduce the number of containers in the vulcanizing process, and to reduce the cost of investment in the facility.

DETAILED DESCRIPTION OF THE INVENTION

Hereinafter, an exemplary embodiment of the present invention will be described with reference to FIGS. 1A to 5.

Figure 1A:
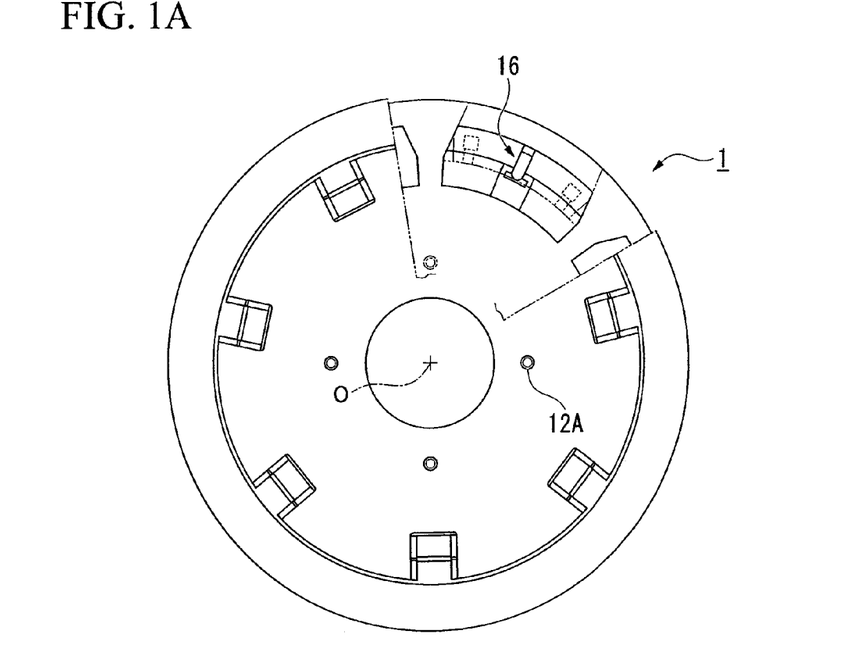
FIG. 1A is a plan view showing a schematic configuration of a container which is a target of a container mold exchanging apparatus according to the present invention.
Figure 1B:
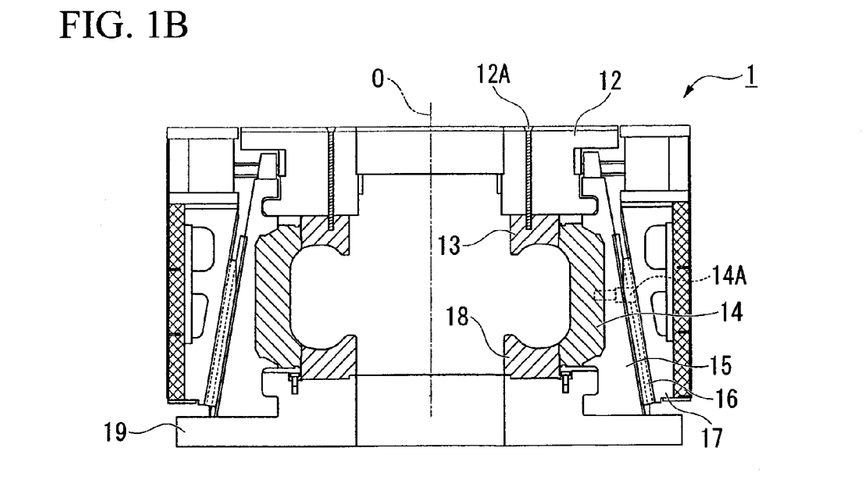
FIG. 1B is a longitudinal sectional view showing a schematic configuration of the container which is the target of the container mold exchanging apparatus according to the present invention.

FIGS. 1A and 1B are diagrams showing an example of a container which is a target of the present invention, where the reference numeral 1 denotes the container.

The container 1 is substantially formed in a cylindrical shape, and includes a substantially cylindrical jacket 17 which forms a side surface of the cylindrical container; a top plate 12 which forms an upper surface of the cylindrical container; a lower plate 19 which forms a lower surface of the cylindrical container; plural segments 15 which are arranged in the inside of the jacket 17; an upper sidewall mold 13; plural tread molds 14 which are respectively mounted on the plural segments 15; a lower sidewall mold 18; and a guide 16 which supports the plural segments 15 from the jacket 17 so that the segments 15 are movable in the direction intersecting the axis O of the container 1.

Each of the upper sidewall mold 13 and the lower sidewall mold 18 is formed in an annular shape, and the upper sidewall mold 13 and the lower sidewall mold 18 are respectively supported to the top plate 12 and the lower plate 19.

Both sidewalls of the tire are formed by the upper sidewall mold 13 and the lower sidewall mold 18, and a tread is formed in the circumferential surface of the tire by the tread molds 14.

The combination of the plural (in the embodiment, seven) tread molds 14 is formed in an annular shape about the axis O. The inner peripheries of the tread molds 14 combined in the annular shape form the tread in the circumferential surface of the tire.

In addition, the inner peripheral sides on the upper and lower surfaces of the tread molds 14 are respectively provided with engagement recessed portions 61.

In addition, the outer diameter formed by the segments 15 mounted with the tread molds 14 gradually increases downward along the axis of the container 1, and the inner diameter of the jacket 17 gradually increases downward along the axis thereof. Likewise, the outer diameter formed by the segments 15 and the inner diameter of the jacket 17 are formed so as to conform to each other, and the guide 16 is formed between the segments 15 and the jacket 17.

With this configuration, when the jacket 17 moves up relative to the segments 15, and the segments 15 and the tread mold 14 move outward in the radial direction. When the jacket 17 moves down relative to the segments 15, the segments 15 and the tread mold 14 move inward in the radial direction.

In the state where the jacket 17 moves up relative to the segments 15 and the tread mold 14 is located on the outside in the radial direction, a green tire is disposed in the container 1 or a cured tire is removed therefrom.

FIGS. 2 to 4B are diagrams showing a container mold exchanging apparatus 2 according to the embodiment of the present invention.

The container mold exchanging apparatus 2 includes a container support body 20, a tread mold exchanging mechanism 30, a mold support body 40, an upper sidewall mold exchanging mechanism 50, and a first moving mechanism 60.

Figure 2:
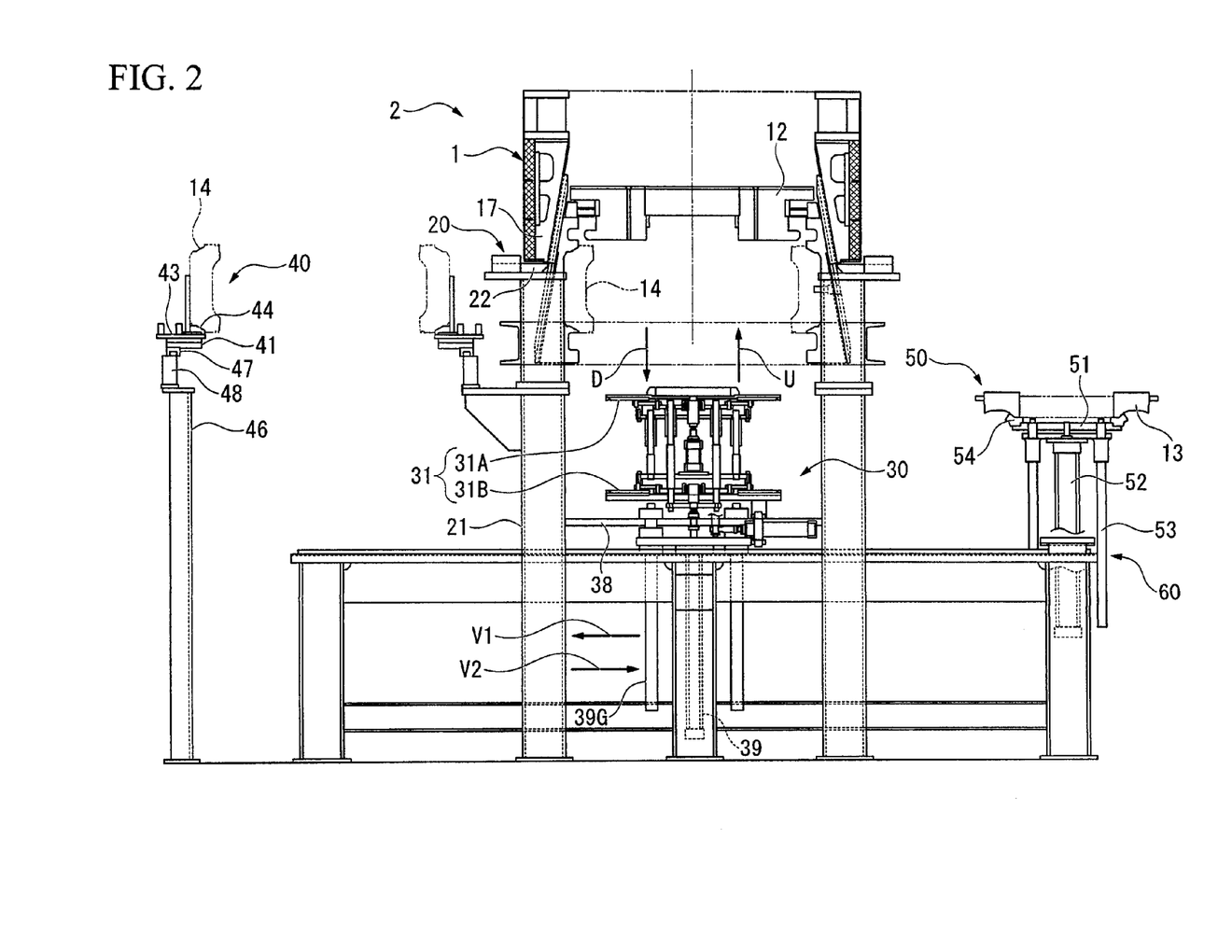
FIG. 2 is a side view showing a schematic configuration of the container mold exchanging apparatus according to the embodiment of the present invention.
Figure 3:
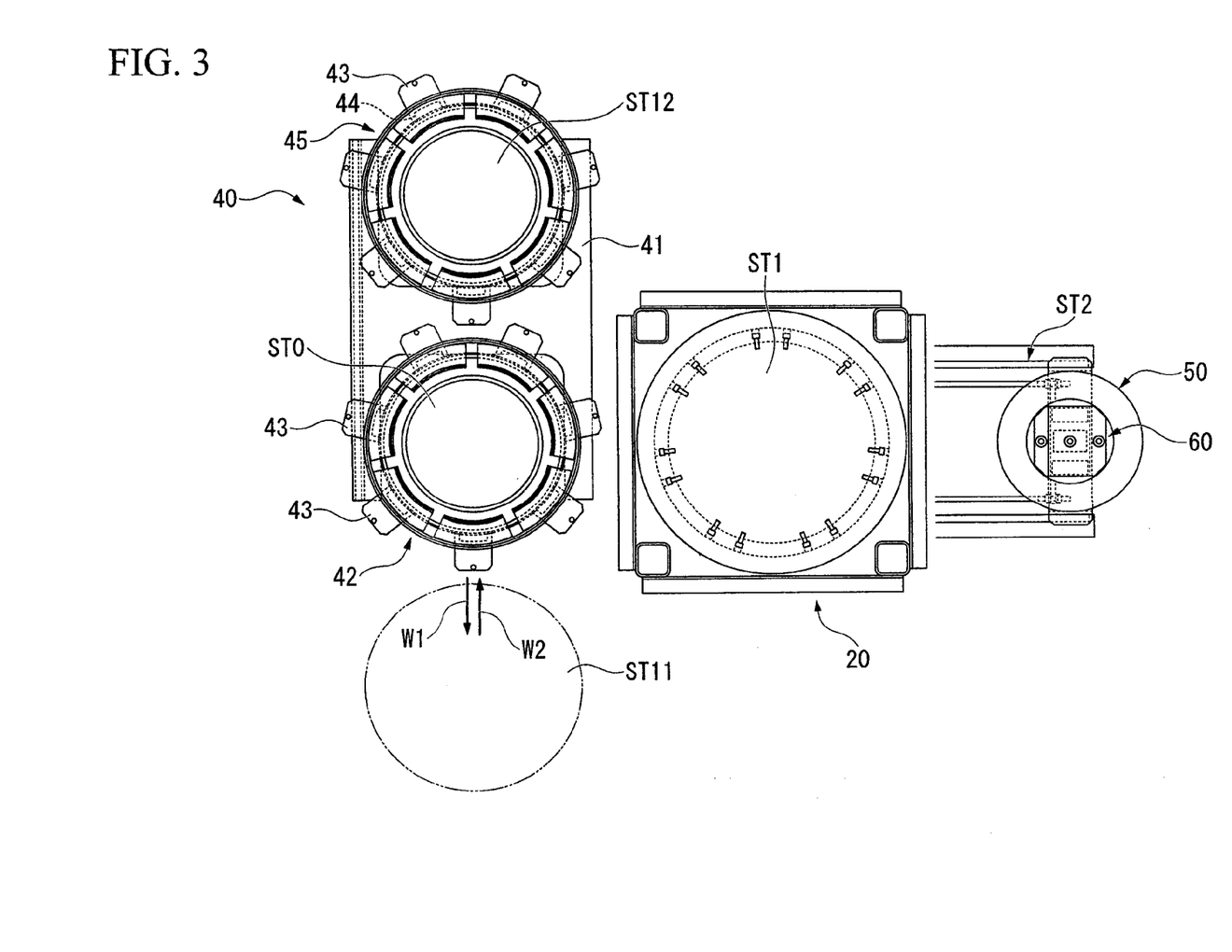
FIG. 3 is a plan view showing a schematic configuration of the container mold exchanging apparatus according to the embodiment of the present invention.

The container support body 20 includes a support base 21 and a mold receiving member 22 disposed in the upper portion of the support base 21, and is capable of holding the container 1 in the state where the jacket 17 moves up and the tread mold 14 is located on the outside in the radial direction.

The tread mold exchanging mechanism 30 supports and receives the tread mold 14. The tread mold exchanging mechanism 30 is movable in the vertical direction by a tread mold gripping mechanism elevating cylinder 39 to be described later and is movable in the horizontal direction by the first moving mechanism. The first moving mechanism is capable of moving the tread mold exchanging mechanism 30 to a mold exchange station ST1 and a delivery station ST0, and the delivery station ST0 is commonly used as the mold support body 40.

Figure 4A:
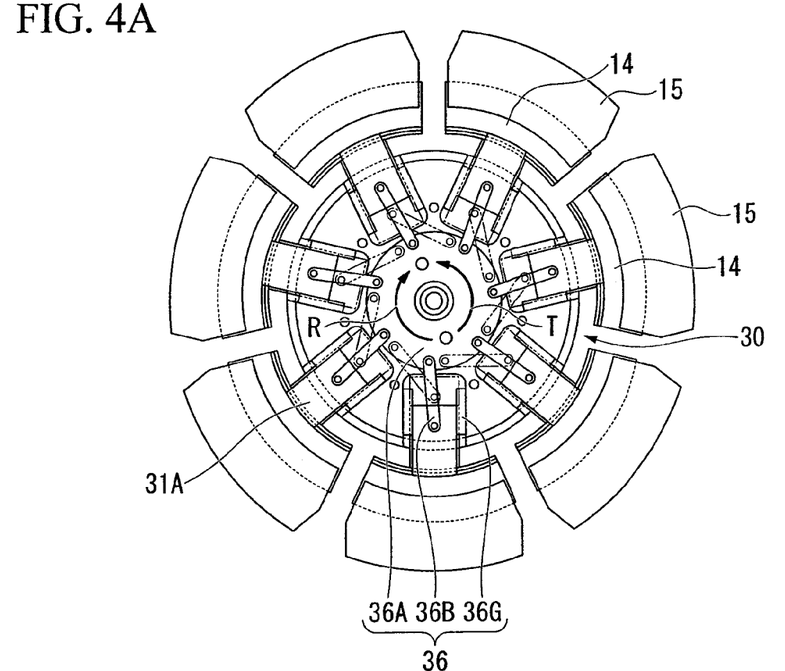
FIG. 4A is a plan view showing a schematic configuration of a tread mold exchanging member according to the embodiment of the present invention.
Figure 4B:
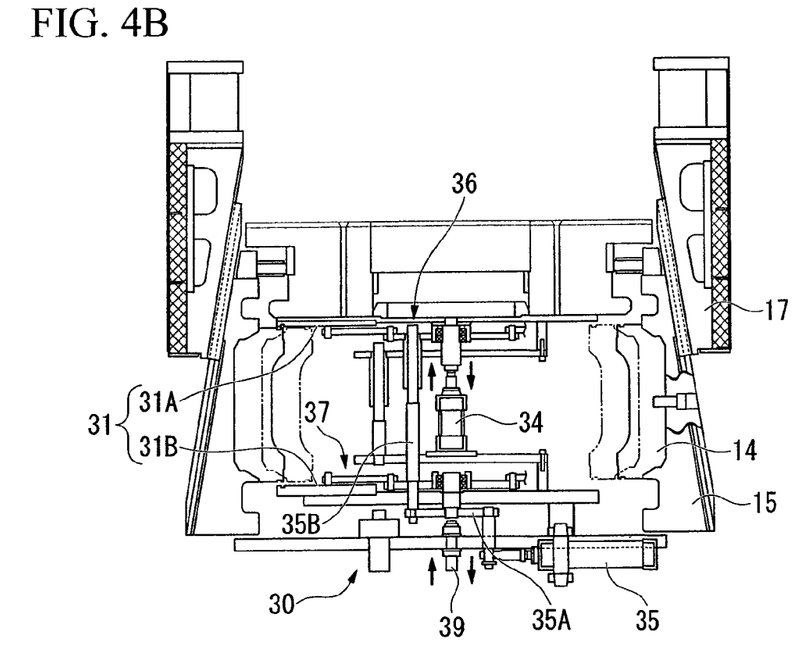
FIG. 4B is a side sectional view showing a schematic configuration of the tread mold exchanging member according to the embodiment of the present invention.

The tread mold exchanging mechanism 30 includes a gripping mechanism 31, a clamp cylinder (a first driving mechanism) 34, a tread mold gripping mechanism elevating cylinder (a second driving mechanism and a fourth driving mechanism) 39, a gripping mechanism expanding-contracting cylinder (a third driving mechanism) 35, a link plate 36, and a link 36A. The gripping mechanism 31 includes an upper gripping member 31A and a lower gripping member 31B.

The inner peripheries of the surfaces of the upper gripping member 31A and the lower gripping member 31B facing the tread mold 14 are respectively provided with engagement protruding portions 62 which are fitted into the engagement recessed portions 61 formed on the inner peripheral sides of the upper and lower surfaces of the tread mold.

The upper gripping member 31A and the lower gripping member 31B are connected to the gripping mechanism expanding-contracting cylinder 35 through the link plate 36, the link 36A, the link member 35A, and a synchronization rod 35B. When the gripping mechanism expanding-contracting cylinder 35 rotates the link plate 36 in the direction depicted by the arrow T, the support plate 31A is advanced along a guide 36G by the link 36A. When the gripping mechanism expanding-contracting cylinder 35 rotates the link plate 36 in the direction depicted by the arrow R, the support plate 31A is withdrawn by the link 36A.

In addition, the tread mold gripping mechanism elevating cylinder 39 has a function of elevating the gripping mechanism 31 with respect to the floor surface.

The mold support body 40 includes a mold trolley 41. The mold trolley 41 includes a first placement portion 42 and a second placement portion 45 which are formed as an annular hole so that the plural tread molds 14 are arranged in an annular shape. The first placement portion 42 and the second placement portion 45 are capable of receiving the exchanged tread mold 14 and holding the tread mold 14 to be exchanged.

In the first placement portion 42 and the second placement portion 45, support plates 43 supporting the lower surface edges of the tread molds 14 are arranged in a radial shape in the outer periphery of the annular hole so as to correspond to the tread mold pieces. The inner peripheral upper surfaces of the first and second placement portions 42 and 45 are each provided with receiving members 44 which reliably hold the tread molds 14.

Accordingly, it is possible to suppress the collapse of the tread molds 14 each placed on the support plates 43.

The mold trolley 41 is movably supported by a vehicle wheel 47 which is placed on a track 48 formed on a base 46. In addition, the first placement portion 42 and the second placement portion 45 are disposed on the mold trolley 41 so as to be movable in the directions depicted by the arrows W1 and W2 by a second moving mechanism (not shown). That is, the first placement portion 42 is movable between a standby station ST12 and the delivery station ST0, and the second placement portion 45 is movable between the delivery station ST0 and a standby station ST11.

The upper sidewall mold exchanging mechanism 50 includes an upper sidewall mold receiving portion 51 and an elevation cylinder 52. The upper sidewall mold receiving portion 51 is provided with a receiving member 54 which is formed in a shape corresponding to the mold shape of the upper sidewall mold 13 so as to reliably hold the lower portion of the upper sidewall mold 13. The upper sidewall mold receiving portion 51 is elevated by the elevation cylinder 52 at the mold exchange station ST1, and is capable of mounting the upper sidewall mold 13 to or separating it from the container 1.

The first moving mechanism 60 is formed by a known driving source such as a motor and an actuator, and is capable of moving the tread mold exchanging mechanism 30 and the upper sidewall mold exchanging mechanism 50 in the directions depicted by the arrows V1 and V2. That is, the tread mold exchanging mechanism 30 is movable between the delivery station ST0 and the mold exchange station ST1. The upper sidewall mold exchanging mechanism 50 is movable between the mold exchange station ST1 and the standby station ST2.

Sequence of Exchanging Tread Mold by Gripping Mechanism

Figure 5:
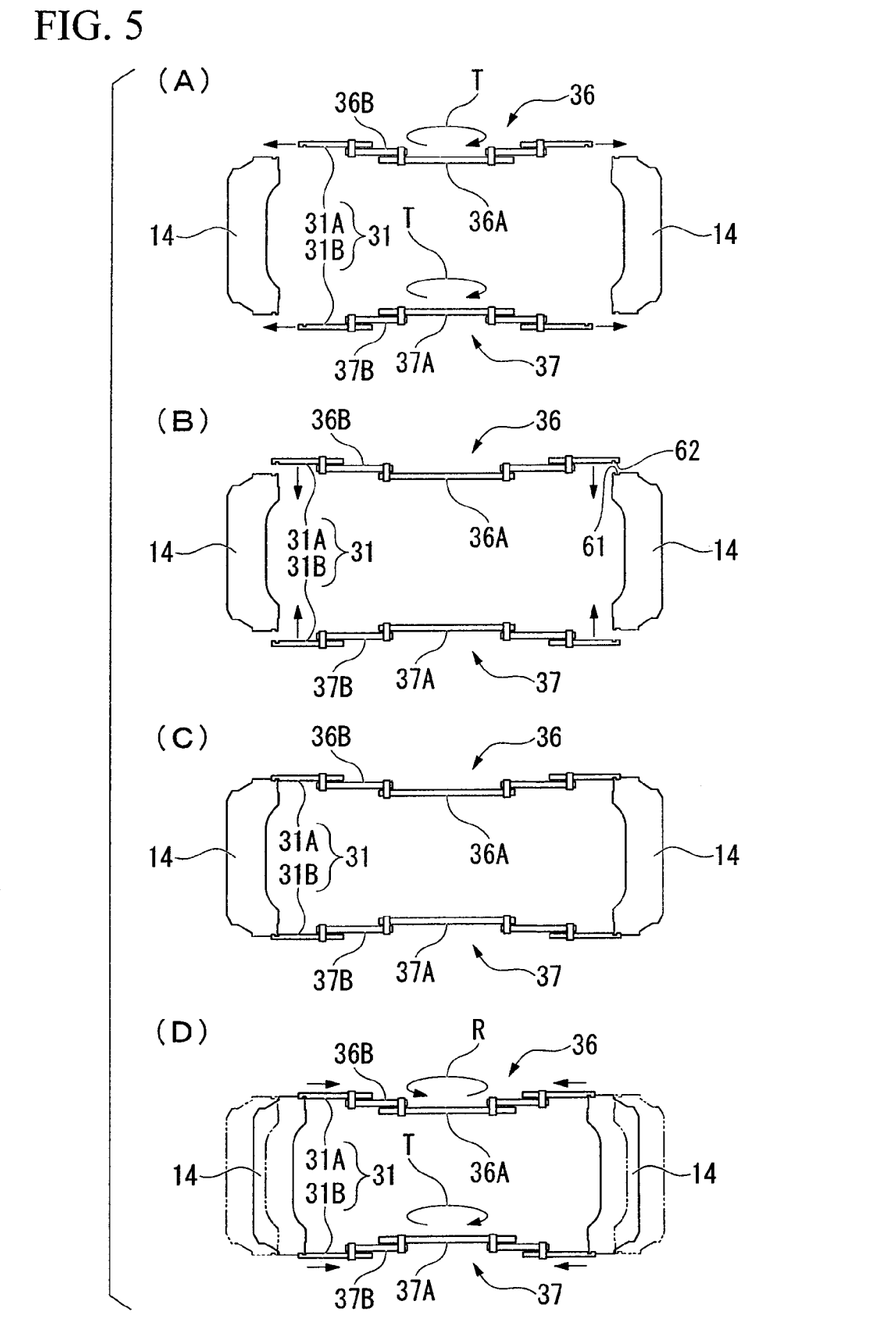
FIG. 5 is a diagram sequentially illustrating the operation of a gripping mechanism according to the embodiment of the present invention.

Next, the operation of the gripping mechanism 31 constituting the container mold exchanging apparatus 2 will be described.

FIG. 5 is a diagram showing a sequence (A) to (D) of exchanging the tread molds 14 by using the gripping mechanism 31 of the container mold exchanging apparatus 2.

In addition, in FIG. 5, the container 1, from which the lower sidewall mold 18 and the lower plate 19 are separated, is placed and supported on the container support body 20. The gripping mechanism 31 is moved up by the tread mold gripping mechanism elevating cylinder 39 so that the upper gripping member 31A is located at a position higher than the upper surface of the tread mold 14 and the lower gripping member 31B is located at a position lower than the lower surface of the tread mold. This position corresponds to a predetermined height at which the gripping mechanism 31 is capable of gripping the tread mold 14.

In this state, as shown in (A) of FIG. 5, when the link plate 36A is rotated in the direction depicted by the arrow T, the upper gripping member 31A and the lower gripping member 31B advance outward in the radial direction through the links 36B and 37B. In addition, the rotation of the link plate 36A in the direction depicted by the arrow T is performed by the gripping mechanism expanding-contracting cylinder 35 shown in FIG. 4B.

At this time, the upper gripping member 31A and the lower gripping member 31B are advanced until the engagement protruding portions 62 formed in the front ends thereof arrive at positions corresponding to the engagement recessed portions 61 formed in the tread mold 14.

Next, as shown in (B) of FIG. 5, the upper gripping member 31A is moved down, and the lower gripping member 31B is moved up. In addition, the downward movement of the upper gripping member 31A is performed by the clamp cylinder 34 shown in FIG. 4B, and the upward movement of the lower gripping member 31B is performed by the tread mold gripping mechanism elevating cylinder 39 shown in FIG. 4B.

As a result, as shown in (C) of FIG. 5, both upper and lower surfaces of the tread mold 14 are gripped by the upper gripping member 31A and the lower gripping member 31B, and the engagement protruding portions 62 of the gripping mechanism are fitted into the engagement recessed portions 61 of the tread mold 14.

Since the tread mold 14 is reliably gripped in this state, it is possible to separate the tread mold 14 from the segment 15 by loosening an attachment bolt 14A connecting the segment 15 and the tread mold 14.

Subsequently, as shown in (D) of FIG. 5, when the link plate 36A is rotated in the direction depicted by the arrow R, the upper gripping member 31A and the lower gripping member 31B are withdrawn inward in the radial direction through the links 36B and 37B. In addition, the rotation of the link plate 36A in the direction depicted by the arrow R is performed by the gripping mechanism expanding-contracting cylinder 35 shown in FIG. 4B.

As a result, the tread mold 14 is separated from the segment 15 while being gripped by the upper gripping member 31A and the lower gripping member 31B.

The separated tread mold 14 is moved down by the tread mold gripping mechanism elevating cylinder 39 to a height at which the tread mold 14 is movable to the delivery station ST0 by the first moving mechanism 60.

In accordance with the above-described sequence, it is possible to separate the tread mold 14 from the segment 15.

In addition, the tread mold 14 is mounted on the segment 15 in a reverse sequence of the separation operation.

The sequence of separating the tread mold 14 from the container 1 for an exchange operation will be described.

1) First, as in the known example, the lower sidewall mold 18 and the lower plate 19 are separated from the container 1 by using a hoist or the like.

2) The container 1, from which the lower sidewall mold 18 and the lower plate 19 are separated, is placed on the container support body 20. At this time, the jacket 17 is moved up relative to the segment 15, and the tread mold 14 is located on the outside in the radial direction.

3) The upper sidewall mold exchanging mechanism 50 moves to the mold exchange station ST1. Then, the upper sidewall mold receiving portion 51 is moved up by the elevation cylinder 52, and the lower portion of the upper sidewall mold 13 is received by the receiving member 54 of the upper sidewall mold receiving portion 51.

4) The attachment bolt 12A is loosened until the upper sidewall mold 13 can be separated from the top plate 12 by hand.

5) The elevation cylinder 52 is moved down so as to move down the upper sidewall mold receiving portion 51 to a predetermined position. Then, the upper sidewall mold exchanging mechanism 50 is moved to the mold standby station ST2.

6) The tread mold exchanging mechanism 30 is moved to the mold exchange station ST1. The gripping mechanism 31 is moved up by the tread mold gripping mechanism elevating cylinder 39 to a position at which the tread mold 14 can be gripped.

7) The tread mold 14 is separated by the gripping mechanism 31. The sequence at this time is the same as the sequence of exchanging the tread mold by using the gripping mechanism.

8) The tread mold gripping mechanism elevating cylinder 39 is moved down so as to move down the tread mold 14 to a predetermined position. Then, in the state where the tread mold 14 is gripped by the gripping mechanism 31, the tread mold 14 is moved to the delivery station ST0. At this time, the first placement portion 42 of the mold support body 40 is located at the delivery station ST0.

9) The gripping mechanism 31 is moved up by the tread mold gripping mechanism elevating cylinder 39 so that the gripping mechanism 31 of the tread mold exchanging mechanism 30 moves and places the tread mold 14 on the first placement portion 42.

10) When the tread mold 14 is moved and placed onto the first placement portion 42 and the moving-placing operation ends, the gripping mechanism 31 is moved down by the tread mold gripping mechanism elevating cylinder 39. The sequence at this time corresponds to the reverse of the sequence of exchanging the tread mold by using the gripping mechanism.

11) The first placement portion 42 on the mold support body 40 is moved from the delivery station ST0 to another position by the second moving mechanism (not shown), and the second placement portion 45 is moved to the delivery station ST0.

12) The gripping mechanism 31 is moved up by the tread mold gripping mechanism elevating cylinder 39 so as to receive the tread mold 14 to be exchanged from the second placement portion 45, and the gripping mechanism 31 is moved down. The sequence at this time is the same as the sequence of exchanging the tread mold by using the gripping mechanism.

13) In the state where the tread mold 14 is gripped by the gripping mechanism 31, the gripping mechanism 31 is moved from the delivery station ST0 to the mold exchange station ST1 by the first moving mechanism 60.

14) Subsequently, the tread mold 14 is mounted on the container 1 in the reverse sequence of exchanging the tread mold by using the gripping mechanism.

15) Subsequently, the upper sidewall mold 13 is mounted on the top plate 12 by the upper sidewall mold exchanging mechanism 50.

According to the container mold exchanging apparatus 2, it is possible to easily and efficiently separate the tread mold 14 from the segment 15 of the container 1 or to mount the tread mold 14 to the segment 15.

As a result, since it is possible to exchange the tread mold 14 without supporting the tread mold 14 by hand, it is possible to reduce the difficulty in the tread mold exchanging operation.

In addition, the tread mold exchange time is shortened. Accordingly, since the container 1 can be commonly used by performing a small additional process on the tread mold 14, it is possible to suppress the investment in the facility.

Further, since it is possible to easily and efficiently exchange the tread mold 14, it is possible to reduce the operation performed by the crane or hoist.

It is possible to save power by reducing the operation performed by hand.

Further, since the container mold exchanging apparatus 2 includes the mold support body 40, it is possible to reliably and easily support the tread mold 14 separated from the segment 15 by using the mold support body 40 and to receive the tread mold 14 to be transferred and exchanged by using the mold support body 40. Accordingly, it is possible to efficiently exchange the tread mold 14.

Since the container mold exchanging apparatus 2 includes the upper sidewall mold exchanging mechanism 50, it is possible to easily and efficiently separate the upper sidewall mold 13. Accordingly, it is possible to smoothly perform the exchange operation of the tread mold 14. Also, it is possible to easily and efficiently separate and mount the tread mold 14.

Since the container mold exchanging apparatus 2 includes the first moving mechanism 60, the tread mold exchanging mechanism 30 is efficiently movable between the delivery station ST0 and the mold exchange station ST1, and the upper sidewall mold exchanging mechanism 50 is movable between the mold exchange station ST1 and the standby station ST2. Accordingly, it is possible to efficiently move and exchange the upper sidewall mold 13 and the tread mold 14.

Further, since the mold support body 40 includes the first placement portion 42 and the second placement portion 45, the first placement portion 42 and the second placement portion 45 are movable to the delivery station ST0 by the second moving mechanism (not shown). Accordingly, it is possible to easily and efficiently exchange the separated tread mold 14 with the tread mold 14 to be mounted.

As the second moving mechanism, a known driving source such as a motor and an actuator may be used.

Further, the present invention is not limited to the above-described embodiment, but may be modified into various forms in the scope not departing from the spirit of the invention.

For example, in the above-described embodiment, the case is described in which the front ends of the upper gripping member 31A and the lower gripping member 31B are respectively provided with the engagement protruding portions 62 engaging with the engagement recessed portions 61 formed in the inner peripheral sides on the upper and lower surfaces of the tread mold 14 for the purpose of performing the reliable gripping operation. However, any one or both of the engagement protruding portions 62 may be omitted if the tread mold 14 can be reliably gripped.

In the above-described embodiment, the case is described in which the elevation cylinder 39 constituting the fourth driving mechanism is commonly used as the second driving mechanism elevating the lower gripping member 31B, but the second driving mechanism may be formed separately from the fourth driving mechanism.

In the above-described embodiment, the case is described in which the first to fourth driving mechanisms are constituted by the cylinder, but the cylinder may be partially or entirely constituted by, for example, a linear actuator, a motor, or the like or the combination of a link mechanism, the linear actuator, and a motor other than the cylinder.

In the above-described embodiment, the case is described in which the container mold exchanging apparatus 2 includes the mold support body 40 and the upper sidewall mold exchanging mechanism 50, but the container mold exchanging apparatus 2 does not have to include one or both of the mold support body 40 and the upper sidewall mold exchanging mechanism 50.

While preferred embodiments of the present invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A container mold exchanging apparatus for exchanging tread molds of a substantially cylindrical container, the container including an upper sidewall mold which molds a sidewall as one side of a tire, a lower sidewall mold which molds a sidewall as the other side of the tire, a plurality of tread molds which mold a tread of the tire, a top plate which is formed in a disk shape and to which the upper sidewall mold is fixed, a lower plate which is formed in a disk shape and to which the lower sidewall mold is fixed, a jacket which is substantially formed in a cylindrical shape, and a plurality of segments which are arranged in the inside of the jacket and to which the plurality of tread molds are respectively fixed, the container mold exchanging apparatus comprising:

a container support body which supports the jacket of the container from which the lower sidewall mold is separated;

a gripping mechanism which includes upper and lower gripping members and grips each tread mold so as to be interposed between the upper and lower gripping members in the vertical direction;

first and second driving mechanisms which respectively elevate the upper and lower gripping members;

a third driving mechanism which expands or contracts the upper and lower gripping members in the radial direction of the container; and a fourth driving mechanism which moves the gripping mechanism along the axis of the container relative to the container support body.

2. The container mold exchanging apparatus according to claim 1, further comprising:

a mold support body which supports the plurality of tread molds separated from the plurality of segments.

3. The container mold exchanging apparatus according to claim 1, further comprising an upper sidewall mold exchanging mechanism which separates the upper sidewall mold from the container from which the lower sidewall mold is separated.

4. The container mold exchanging apparatus according to claim 2, further comprising
a first moving mechanism which moves the separated tread mold to the mold support body.

5. The container mold exchanging apparatus according to claim 4, wherein the mold support body includes
a first placement portion which is placed the separated tread mold thereon;
a second placement portion which is placed the tread mold to be mounted thereon; and
a second moving mechanism which moves one of the first and second placement portions to a delivery position where the tread mold is transferred.

* * * * *